United States Patent [19]

Polge

[11] 4,373,680
[45] Feb. 15, 1983

[54] COILING PROCESS AND APPARATUS BY RADIALLY WINDING A FILAMENT

[75] Inventor: Jacques Polge, Bures Sur Yvett, France

[73] Assignee: Commissariat a l'Energie Atomique, Paris, France

[21] Appl. No.: 214,680

[22] Filed: Dec. 9, 1980

[30] Foreign Application Priority Data

Dec. 26, 1979 [FR] France .................. 79 31680

[51] Int. Cl.³ .......................................... B65H 81/04
[52] U.S. Cl. .................................. 242/7.02; 156/172; 156/446; 242/4 R; 242/7.14; 242/7.21
[58] Field of Search .............. 242/4 R, 7.21, 7.22, 242/7.14, 7.15, 7.16, 7.01, 7.02, 7.03; 140/92.2; 156/446, 172, 173

[56] References Cited

U.S. PATENT DOCUMENTS 3,128,056 4/1964 Fohrbach .................. 242/7.14
3,963,185 6/1976 Quirk .

FOREIGN PATENT DOCUMENTS 233973 6/1961 Australia .................. 242/4 R
665595 6/1965 Belgium .
1779172 9/1971 Fed. Rep. of Germany .
2012112 9/1971 Fed. Rep. of Germany .
1209847 3/1960 France .
580490 10/1976 Switzerland .
1068737 5/1967 United Kingdom .......... 242/4 R

*Primary Examiner*—Billy S. Taylor
*Attorney, Agent, or Firm*—Oblon, Fisher, Spivak, McClelland & Maier

[57] ABSTRACT

The invention discloses a process and an apparatus for coiling a member by radially winding a continuous filament on to a mandrel. It also discloses the member obtained by this process. The apparatus for coiling the filament or thread (36) consists of a fixed frame (1), a shaft (4) rotating about an axis A which is fixed with respect to the frame (1), a device for rotating shaft (4) and a rotary assembly (2) integral with shaft (4). The rotary assembly (2) consists of a chassis (8) fixed to shaft (4) and supporting structure for rotating the mandrel (10) about an axis B attached to assembly (2) and orthogonal to axis A. The shaft of axis A rotates at a higher speed compared with mandrel (10) about axis B.

5 Claims, 12 Drawing Figures

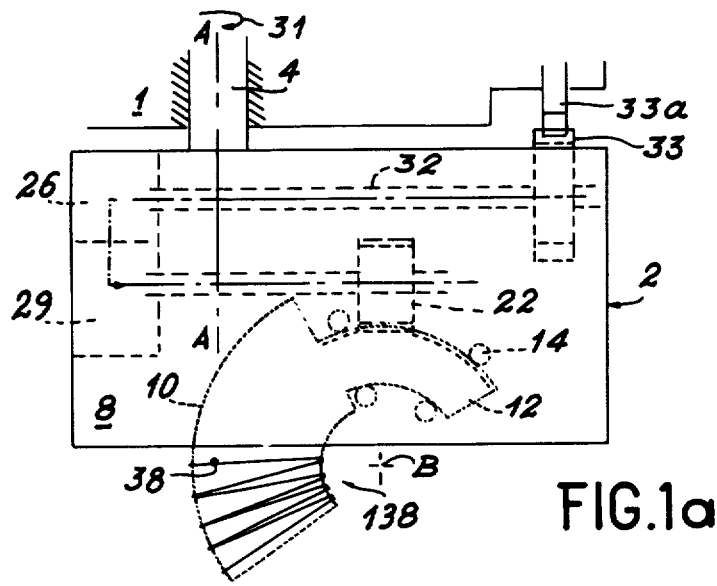
FIG.1a
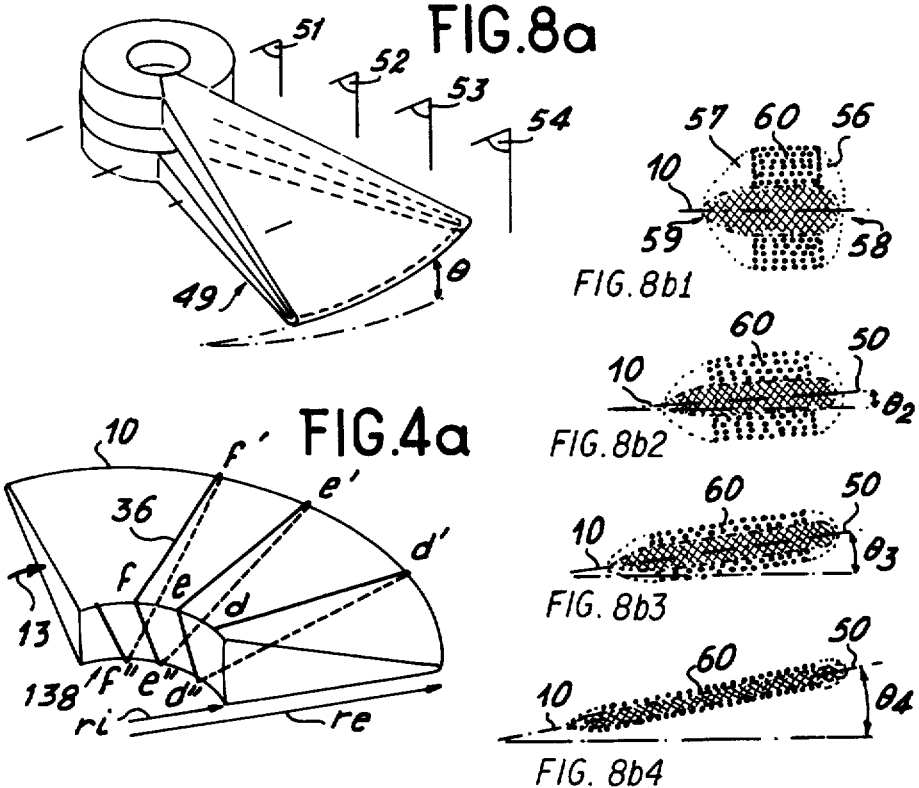
FIG.8a
FIG.4a

COILING PROCESS AND APPARATUS BY RADIALLY WINDING A FILAMENT

BACKGROUND OF THE INVENTION

The present invention relates to a coiling process and apparatus involving the radial winding of a filament. It also relates to the composite members obtained by this process.

The term composite is used to define materials made from a thermosetting resin mould reinforced with filaments, for example carbon or glass filaments. It is known that composite members with continuous, correctly oriented fibres have the best mechanical characteristics.

French Pat. No. 2 359 695, filed on July 27, 1979 discloses bodies of revolution obtained by winding a continuous thermosetting polymer-impregnated filament on to a mandrel between two side plates, followed by the setting of the polymer. Following baking, a composite member with a circular structure is obtained.

Different shell shapes are also known in which the filament is wound at a non-negligible distance from the mandrel axis in accordance with geodesic lines or lines which are close thereto.

Other composite members are known which are produced by the use of unidirectional sheets, sometimes supplied in preimpregnated form, which are shaped in a press. However, unlike in the above cases the fibres are not taut during the hardening of the mould and are not therefore arranged in such a way that optimum mechanical characteristics are obtained. This disadvantage is exacerbated by the overlapping of the warp and weft filaments if the reinforcing sheet is a fabric.

BRIEF SUMMARY OF THE INVENTION

The present invention relates to a coiling process and apparatus involving the radial winding of a continuous filament. It also relates to composite members obtained by this process.

The apparatus according to the invention for coiling a filament on to a sector-shaped mandrel comprises a shaft rotating about a first axis A, a device for rotating the mandrel about a second axis B relative to a reference point defined by said axis B and means for simultaneously displacing axis B in such a way that it rotates about axis A which is orthogonal thereto.

The members obtained by this process have a reinforcing thickness which varies from the edge to the centre. This thickness increases towards the centre. This property is advantageous from the mechanical standpoint as will be shown hereinafter.

Preferably the coiling apparatus according to the invention comprises a fixed frame, a shaft rotating on itself about its axis, namely fixed axis A, means for rotating the shaft, an assembly integral with the shaft, i.e. which also rotates about the fixed axis A. The assembly consists of a chassis supporting means for in turn rotating the mandrel about axis B attached to said assembly and orthogonal to axis A, the rotation speed of the shaft of axis A being greater than that of the mandrel about axis B.

In most cases the reinforcement thickness of the filament coiled on to the mandrel is not such that the centre of rotation of the member, i.e. axis B, is reached. Thus, a ring and not a circle is obtained in the case where the mandrel is a ring, a truncated cone and not a cone; a zone excluding the apex in the case of a body of revolution, steps without a central column in the case of a spiral staircase, etc.

However, according to an assembly feature it is possible to produce members which are not slotted at the centre, axis B being imaginary. Thus, the rotation of the mandrel about axis B is preferably obtained by a circular arc-shaped supporting arm of axis B and carrying the mandrel at one of its ends, means for guiding the supporting arm in accordance with a circular arc centered on axis B and means for driving the supporting arm.

Thus, as axis B is imaginary, this permits the presence of fibres at the centre of the members coiled by means of this apparatus.

The supporting arm is advantageously driven by an endless screw or worm meshing on teeth cut in the arm.

According to an embodiment, the worm is rotated by means of a kinematic train comprising a reduction gear, a reversing gear and a pair of bevel pinions at 90°. One of them, fixed to the fixed frame, remains stationary, whilst the rotation of the other results, ipso facto, from the rotation of the chassis about axis A. The reversing gear has three positions: "forward travel," "reverse travel" and "dead centre."

Passing from one to the other of the first two positions reverses the direction of rotation of the mandrel about axis B. When the reversing gear is in the third position the kinematic train is interrupted, so that the mandrel no longer rotates about axis B, although the chassis continues to rotate about axis A. The chassis continues to rotate about axis A in the same direction.

The process according to the invention for the radial coiling of a filament on to a sector-shaped mandrel comprises the filament being brought into the coiling plane of one end of the mandrel, it is tensioned by a first rotation of the mandrel, the reversing gear being at dead centre, a first pass is coiled, the reversing gear being in the forward travel position, up to the other end of the mandrel, at least one turn is coiled, the reversing gear again being at dead centre, a second pass is coiled in the opposite direction, the reversing gear being in the reverse travel position and the aforementioned coiling procedure with respect to the first and second passes is repeated until a coiled layer of desired thickness is obtained.

BRIEF DESCRIPTION OF THE DRAWINGS

The invention is described in greater detail hereinafter relative to non-limitative embodiments and the attached drawings, wherein show:

FIGS. 1 and 1a show two embodiments of the coiling apparatus according to the invention;

FIG. 4 shows the coiling process according to the invention, wherein FIG. 4-1 schematically shows the view along line III—III while FIG. 4-2 shows the view of FIG. 1;

FIG. 4a shows the mandrel.

FIG. 8a shows a fourth example of members coiled according to the process of the invention; and FIG. 8b shows sections of FIG. 8a.

DETAILED DESCRIPTION OF THE PREFERRED EMBODIMENTS

Figure 1:
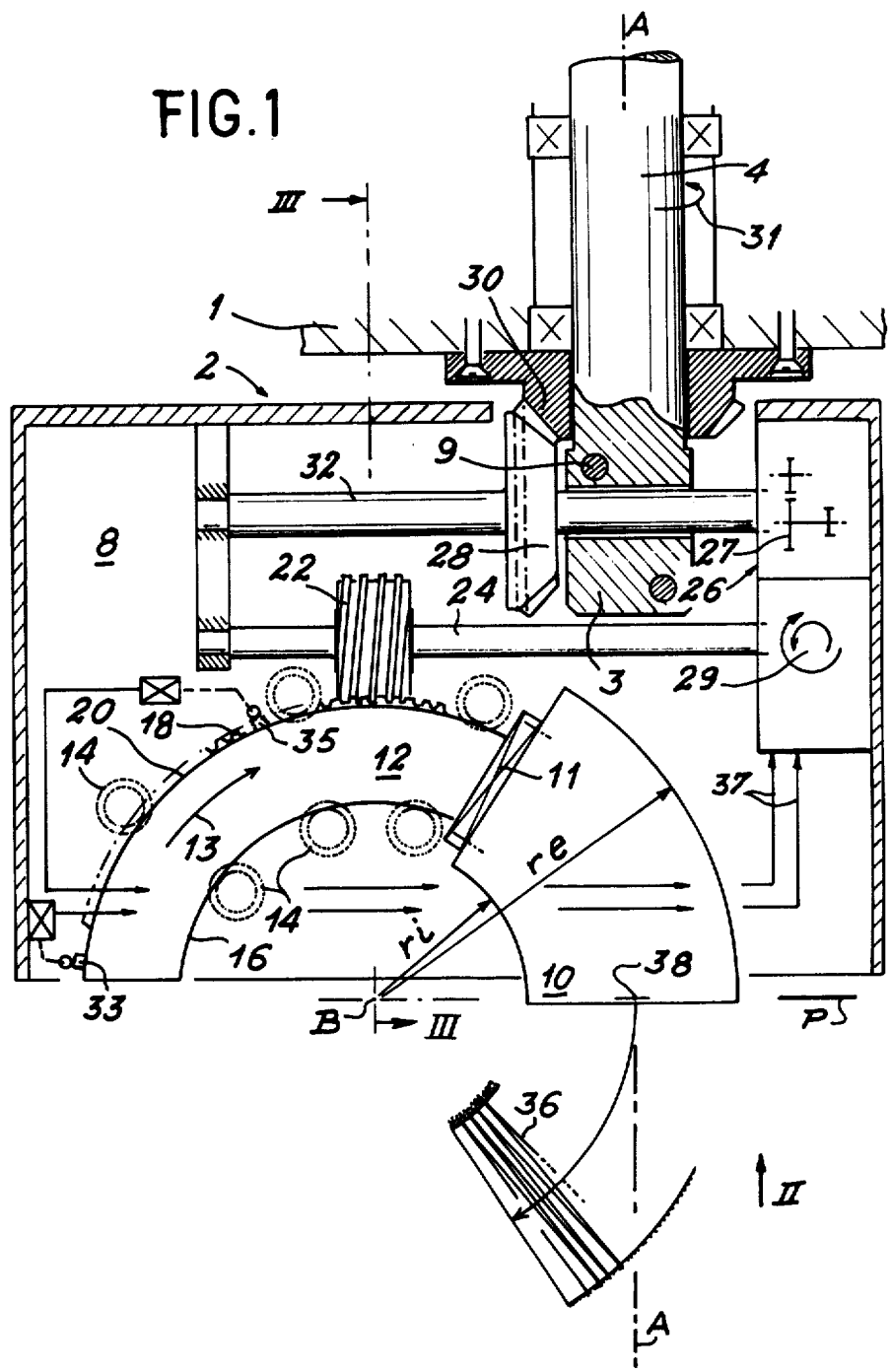

FIG. 1 shows an apparatus according to the invention for coiling a continuous filament on to a mandrel, said apparatus comprising a fixed frame 1 and a rotary assembly 2. Assembly 2 comprises chassis 8 carried by shaft 4 of axis A. The (not shown) motor is located at one of the ends of shaft 4, namely that within the frame 1. The other end leads to block 3 to which are fixed, by means of bolts 9, the two side plates of chassis 8. Chassis 8 carries the means for rotating mandrel 10 on which is coiled the filament in the direction of arrow 13 about the non-materialized axis B, attached to chassis 8 and orthogonal to axis A. Mandrel 10 is mounted at 11 at one end of the circular arc-shaped supporting arm 12 rotating about axis B. Means are provided for guiding supporting arm 12 along a circular trajectory centered on axis B. They are constituted by a series of rollers 14 distributed along the inner perimeter 16 and the outer perimeter 18 of supporting arm 12.

Teeth 20 cut into the supporting arm 12 transmit to the latter the movement received from the endless screw or worm 22 rotated by a shaft 24, which is itself rotated by means of a kinematic train formed by a reduction gear 26, a reversing gear 29 and a pair of bevel pinions 28 and 30, offset by 90°.

Reduction gear 26 comprises a gear train 27 which reduces the rotary speed of shaft 24 compared with that of shaft 32. The rotary speed of supporting arm 12 about axis B is reduced again compared with that of shaft 24 by means of screw 22 meshing in teeth 20. Thus, the rotary speed of supporting arm 12 is greatly reduced compared with that of assembly 2 about axis A.

The reversing gear 29 makes it possible to rotate shaft 24 in both directions. Thus, for a rotation of shaft 4 in the direction indicated by arrow 31 supporting arm 12 can be driven in both directions and therefore so can mandrel 10. The reversing gear 29 can be manually controlled or, as shown in FIG. 1, can be controlled by end of travel contacts 33 and 35 by means of wires 37.

In addition, reversing gear 29 has a "dead centre," making it possible to immobilize shaft 24 and consequently supporting arm 12 with respect to chassis 8, while assembly 2 can rotate about axis A.

The bevel pinion 28 rotates with shaft 32 with which it is integral. Pinion 30 belonging to the fixed frame 1 remains stationary.

Thus, in the presently described embodiment a single driving motor drives the rotary assembly 2 and the supporting arm 12.

Filament 36 is unwound from a point 38, whose projection is shown in FIG. 1. The coiling plane P is the plane within which the filament 36 moves during coiling. It is geometrically defined by axis B and point 38.

FIG. 1a shows a second embodiment of the coiling apparatus according to the invention. As in the first embodiment of FIG. 1, the second embodiment comprises a fixed frame 1 and a rotary assembly 2. Assembly 2 particularly comprises chassis 8 carried by shaft 4 of axis A. At one of the ends of shaft 4, located within frame 1, there is a (not shown) motor. The other end of shaft 4 leads to the block to which are fixed the two side plates of chassis 8. In an identical manner to that described with reference to FIG. 1 chassis 8 carries means for rotating mandrel 10 on which is coiled the filament in the direction of arrow 13 about the imaginary axis B attached to chassis 8 and orthogonal to axis A. Once again in the same way as with the apparatus of FIG. 1, the second embodiment of the invention comprises means for guiding the supporting arm 12 along a circular arc centred on axis B. These means are constituted by a series of rollers 14 distributed along the inner perimeter 16 and outer perimeter 18 of supporting arm 12.

Teeth 20 cut in the supporting arm 12 transmit to the latter the movement received from the worm 22 rotated by shaft 24. These constructional details, which are identical to those of the apparatus of FIG. 1, are not shown in detail in FIG. 2.

The difference between these two embodiments of the apparatus according to the invention is provided by the means for rotating the worm 22 meshing with teeth 20. These means are constituted by a kinematic train comprising a reduction gear 26', a reversing gear 29' and a ratchet wheel 33' immobilized in rotation on the input shaft 32' of reduction gear 26'. A pin 33a fixed to the fixed frame 1 meshes with wheel 33'. Thus, for each passage of assembly 2, pin 33a rotates wheel 33' by a given angle and the shaft 32' drives the kinematic train up to the worm 22 which, in turn, drives the supporting arm 12. This brings about an advance by increments of the supporting arm 12. Whereas in the first embodiments supporting arm 12 was continuously driven, in the second embodiment it is discontinuously driven. Drive takes place when the filament 36 unwound from the fixed point 38 is in contact with portion 138 of mandrel 10 in the vicinity of axis B. As a result of this arrangement members are produced for which the orientation of the fibres is exactly radial, except in the cylindrical part 138 adjacent to axis B, for which there is an advance by increments of the supporting arm 12.

Figure 2:
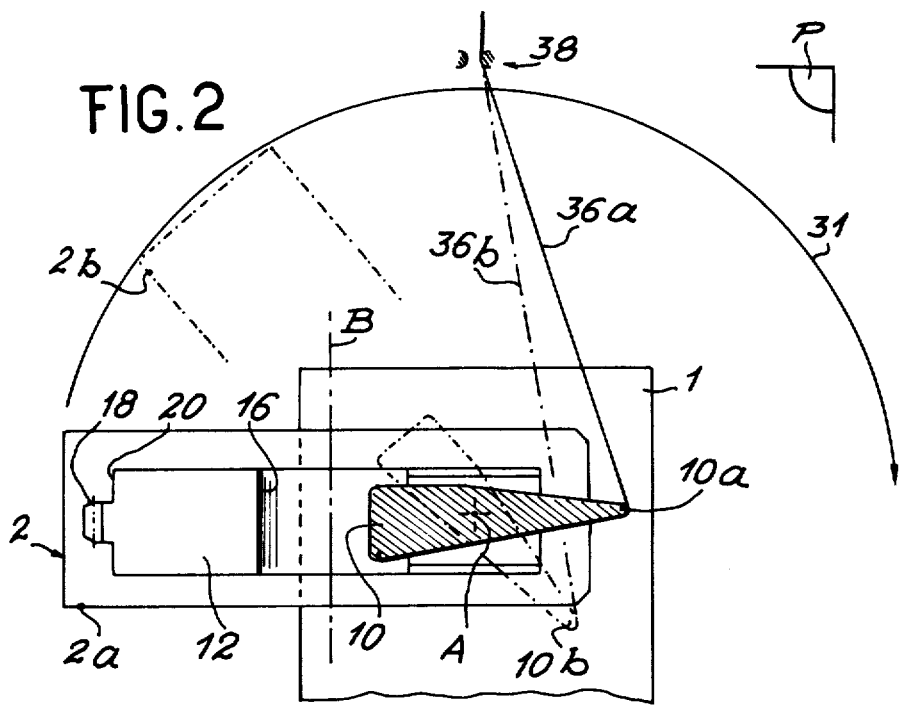
FIG. 2 shows a view in direction II of the apparatus of FIG. 1.

FIG. 2 shows a view in direction II of the apparatus of FIG. 1. FIG. 2 more particularly shows the cross-section of mandrel 10, which is chosen as a function of the member which it is desired to obtain. Mandrel 10 is a sector, whose axis coincides with the axis B shown by chain lines. It is also possible to see axis A about which rotates, in the direction of arrow 31, the moving assembly 2, whereof a first position 2a is shown by a continuous line and a second position 2b by chain lines. The filament 36 to be coiled on to mandrel 10 is unwound from the fixed point 38. Two different positions 36a and 36b of filament 36 are shown by continuous and broken lines respectively and these correspond to two positions 10a and 10b of mandrel 10.

It is obvious that the point 38 from which filament 36 is unwound must be located at an adequate distance from axis A to enable the rotation of moving assembly 2 to take place.

During coiling, filament 36 moves in plane P, which is the plane of FIG. 2.

Figure 3:
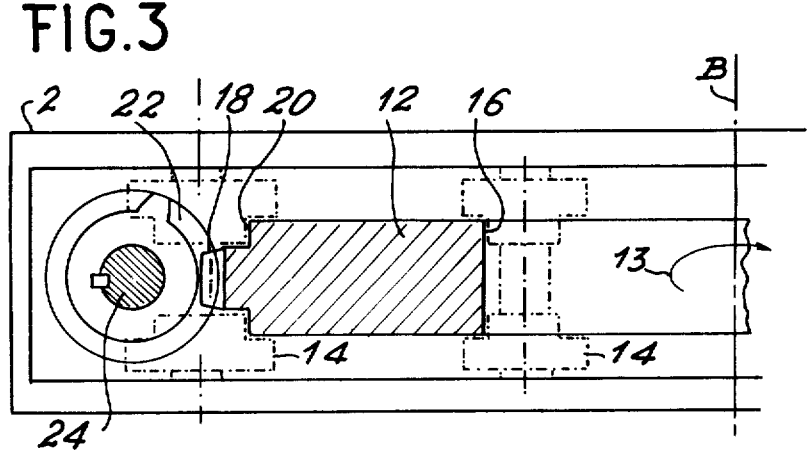
FIG. 3 shows a sectional view along the line III—III of FIG. 1.

FIG. 3 shows a sectional view along the line III—III of FIG. 1 of assembly 2. In particular it is possible to see the supporting arm 12, its teeth 20, the worm 22 keyed to shaft 24, together with the rollers 14 which guide the supporting arm 12 along a circular path centred on axis B.

Figures 1, 4:
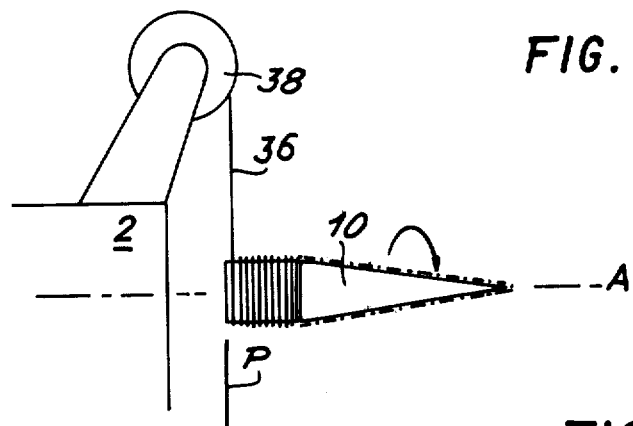
Figures 2, 4:
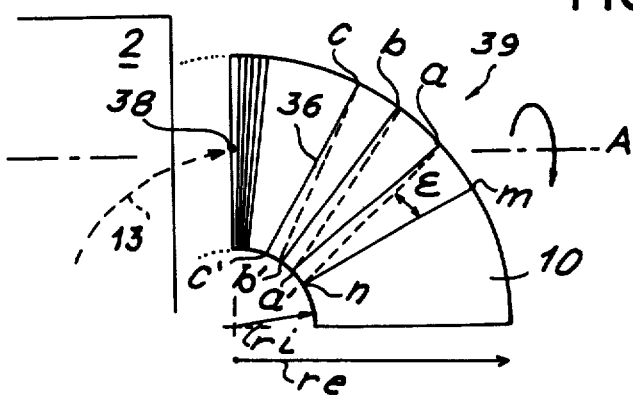

The operation of the coiling apparatus according to the invention shown in FIGS. 1, 2 and 3 is illustrated by FIG. 4.

A mandrel 10, whose shape corresponds to that of the member to be produced is mounted on the supporting arm 12. Mandrel 10 can have a substantially triangular cross-section, as shown in FIG. 2, but it can also be given some other random convex shape.

Filament 36 is brought into the coiling plane P (FIG. 4) within which it moves during coiling. It is wound taut on to the mandrel 10 as a result of a first rotation of the latter. When the reversing gear 29 is at dead centre, the filament 36 describes a meridian curve mn, i.e. a curve defined by the intersection of the coiling plane P and the periphery of mandrel 10.

When the reversing gear 26 is in the forward travel direction, filament 36 is applied to mandrel 10 in a direction inclined with respect to the meridian curve mn by a small angle $\epsilon$ of value:

$$\epsilon = \frac{r_i}{r_e - r_i} \times a,$$

$a$ being the rotary angle of mandrel 10 about axis B when the moving assembly 2 rotates by 180° about axis A, whilst $r_i$ and $r_e$ are respectively the internal and external radii of mandrel 10.

If the ratio of the rotary speed of the moving assembly 2 about axis A compared with that of mandrel 10 about axis B attached to moving assembly 2 is designated by 2k, the above formula becomes:

$$\epsilon = \frac{r_i}{r_e - r_i} \times \frac{\pi}{k}.$$

In zone 39 it is possible to see the winding of filament 36 on to mandrel 10, the angle having been voluntarily exaggerated to make the drawing easier to understand. It can be seen that the turns are more widely spaced on the external radius $r_e$ at points a, b, c, than at the corresponding points a', b', c' on the internal radius $r_i$. This leads to a thicker reinforcement at the centre than at the edge of the member.

For a given member to be produced, i.e. for a given mandrel, the radii $r_i$ and $r_e$ are fixed. Making k sufficiently large, angle $\epsilon$ can be made less than a given value. For this purpose it is merely necessary to choose the reduction ratio of the kinematic train constituted by bevel pinions 28 and 30 of reduction gear 26 and of the wheel and worm system 20, 22. Thus, the orientation of the fibre 36 does not in practice differ from the radial direction mn.

When the reversing gear 26 is in the reverse travel direction, filament 36 occupies a symmetrical position compared with the previous position with respect to the meridian curve mn, the angle $\epsilon$ changing sign, but retaining the same absolute value. From a mechanical standpoint the variations $+\epsilon$, $-\epsilon$ cancel one another out.

FIG. 4a illustrates the operation of the second embodiment of the coiling apparatus according to the invention.

In an identical manner to that described with reference to FIG. 4 a mandrel 10, whose shape corresponds to that of the member to be produced, is mounted on the supporting arm 12. The filament 36 is brought into the coiling plane P and it is wound taut on to mandrel 10 as a result of a first rotation of the latter about axis A. When the reversing gear 29 is at dead centre, the filament 36 describes a meridian curve mn.

When the reversing gear 26 is in the forward travel position, filament 36 is applied to mandrel 10 in a perfectly radial direction and not in a direction inclined to the meridian curve mn by an angle of value $\epsilon$, as was the case with the apparatus of FIG. 1.

FIG. 4a shows the winding of a turn d, d' in a perfectly radial direction, then d', d'', still in a perfectly radial direction. Supporting arm 12 advances by increments in the direction of arrow 13 at the time when filament 36 is applied to the cylindrical part 138 of mandrel 10 adjacent to axis B. Thus, filament 36 is applied obliquely in a direction d''e to mandrel 10. The following turn e, e', e'' in the same way has a perfectly radial direction. A further advance of supporting arm 12 then occurs, corresponding to a further inclination of the filament in the direction e''f prior to the coiling of a third radial turn f, f', f'' and so on.

If, as hereinbefore, $a$ is used to designate the rotary angle of mandrel 10 about axis B when moving assembly 2 rotates by 180° about axis A, the corresponding rotation of mandrel 10 between points d''e and e''f is equal to $2a$, because the advance of mandrel 10 only takes place once per revolution.

It should be noted that the turns are more widely spaced on the external radius $r_e$ at points d', e', f' than at the corresponding points d, e, f, and d'', e'' f'' on the internal radius $r_i$. This leads to a thicker reinforcement at the centre than at the edge of the member.

When the reversing gear 26 is in the reverse travel direction filament 36 is also coiled in a perfectly radial manner. However, the inclination of the filament in the cylindrical part 138 of mandrel 10 is symmetrical to the previous direction.

Figure 5:
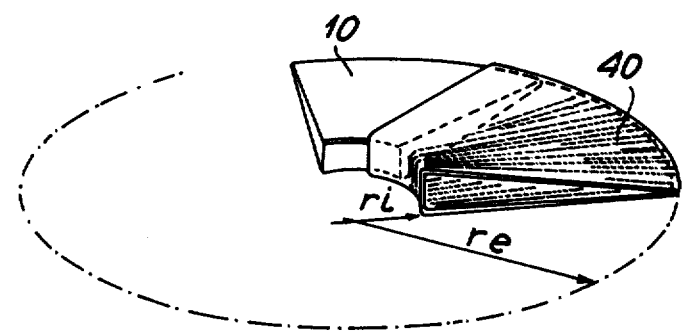
FIG. 5 shows a first example of members coiled according to the process of the invention.

FIG. 5 shows a body of revolution coiled in accordance with the process of the invention. This member has been coiled on to a mandrel, which is only partly shown. The mandrel can be retained, but it can also be removed once the coil has been made and the member has been rigidified by a suitable treatment. Member 40 only constitutes a single sector of a body of revolution. However, a complete body of revolution can be formed by assembling a plurality of members identical to member 40.

The useful fibre reinforcing thicknesses vary as a function of the distance to the centre of the member and decrease towards the outer edge.

In most cases the thickness of the reinforcement coiled on to the mandrel is not such that it reaches the centre thereof, i.e. axis B. For example if the mandrel is a ring sector the member obtained is itself a ring or a ring sector and not a circle or a sector thereof. However, it should be noted that as a result of a special feature of the coiling apparatus according to the invention it is possible to produce members which are not hollowed out at the centre, axis B being imaginary. This permits the presence of fibres at the centre of members.

Figure 6:
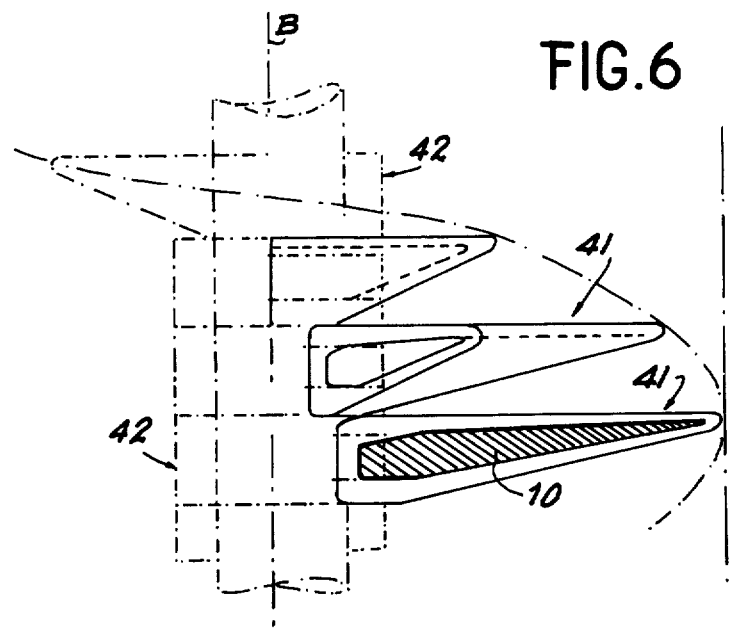
FIG. 6 shows a second example of members coiled according to the process of the invention.

FIG. 6 shows a second example of a member coiled according to the process of the invention. The member is in the form of a step of a spiral staircase. It is intended to be fixed to a central support 42 indicated by broken lines. A section of the mandrel 10 used for forming the step 41 is indicated by haching. It can be seen that the convergence point located on axis B, designated by chain lines, is not reached. However, as stated hereinbefore this convergence point could be reached by the coiling process of the invention.

Figure 7:
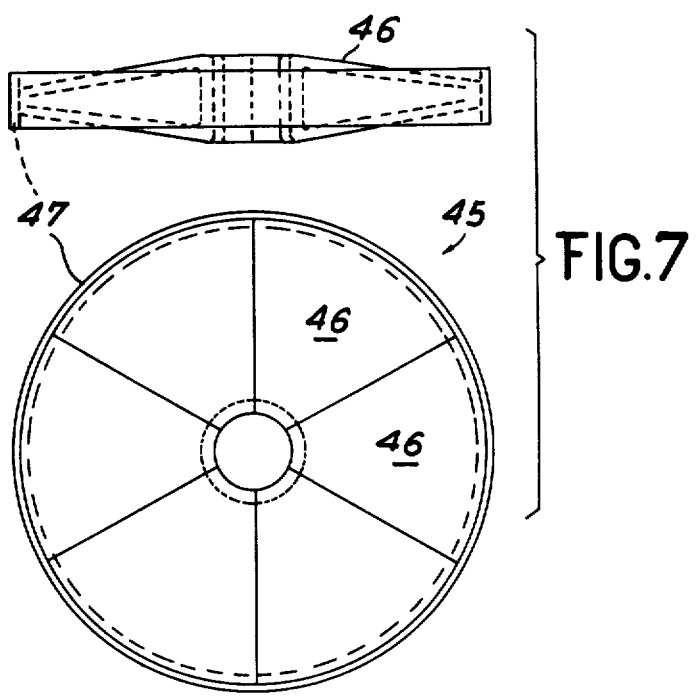
FIG. 7 shows a third example of members coiled according to the process of the invention.

FIG. 7 shows a third example of a member produced by the process of the invention. Member 45 is a wheel with a moderate inertia and is constituted by six sectors 46 having a radial structure produced according to the invention and assembled by means of a circular reverse exterior mould 47. The latter can be produced by any known process and particularly that described in French Pat. No. 2 359 695.

According to a fourth, not shown, example, the member according to the invention is constituted by a single sheet cut before polymerizing the resin, brought in the preimpregnated state between a punch and a die, pressed, polymerized and then associated with a reverse mould and a composite material having a circular structure.

Finally the process also applies to the production of members which are not of revolution and which consequently differ from those envisaged hereinbefore.

FIG. 8 shows a fifth example of a member, which is not of revolution. It is a blade 49, the inclination $\theta$ of its median plane 50 varying on moving from the axis towards the periphery, as can be seen by referring to the general view 8a and also to the drawings 8b1, 8b2, 8b3, 8b4 representing sections by plane 51, 52, 53, 54 parallel to the rotation axis, located at increasing distances therefrom and perpendicular to the median radius of the blade. It can be seen that angles $\theta_2, \theta_3, \theta_4$ increase in value.

The mandrel 10, whose core can be a "honeycomb" has forward portions 56 and rear portions 57 corresponding to the leading edges 58 and trailing edges 59. It could remain integrated to the terminal member. In this case the radial coiling also ensures the cohesion of other parts of the structure.

In FIGS. 8b1 to 8b4 it can also be seen that the coiled filament reinforcing area 16 remains constant, its thickness being reduced when its width increases.

The manufacture of blade 49 is continued by impregnation with resin and then polymerization in a suitably shaped mould. Thus, strong fibres constitute the skeleton of the member, the camber-shaped resin complying with aerodynamic requirements.

What is claimed as new and desired to be secured by Letters Patent of the United States is:

1. An apparatus for coiling a filament on a sector shaped mandrel, said apparatus comprising:
   a fixed frame;
   a shaft having a first fixed longitudinal axis and rotatably held by said frame;
   means for rotating said shaft about said first axis at a first rotational speed;
   a chassis supported by said shaft for rotation about said first axis;
   a circular arc-shaped supporting arm guided by said chassis for rotation about a second axis orthogonal to said first axis;
   drive means for rotating said supporting arm about said second axis at a rotational speed less than said first rotational speed, said drive means including a driven worm screw meshing with a toothed sector of said supporting arm;
   means for supporting said mandrel on one end of said supporting arm; and
   means for supplying said filament to said mandrel in a coiling plane,
   whereby said mandrel rotates about said first and second axes.

2. The apparatus of claim 1 wherein said drive means further includes a kinematic train comprising:
   a first bevel gear integral with said fixed frame;
   a second bevel gear offset by 90° from said first bevel gear and meshing therewith;
   a reduction gear driven by said second bevel gear; and
   a reversing gear driven by said reduction gear and driving said worm screw,
   whereby said supporting arm is continuously rotated about said second axis.

3. The apparatus of claim 1 wherein said drive means further includes a kinematic train comprising:
   a ratchet wheel;
   a reduction gear driven by said ratchet wheel;
   a reversing gear driven by said reduction gear and driving said worm screw; and
   means associated with said fixed frame for contacting and intermittently advancing said ratchet wheel by a predetermined angle,
   whereby said supporting arm is intermittently rotated about said second axis.

4. The apparatus of claim 2 or 3 wherein said reversing gear includes a dead center position adapted to disengage said kinematic train, whereby said supporting arm rotates only about said first axis.

5. A process for radially coiling a filament on a sector shaped mandrel by use of an apparatus including a fixed frame, a shaft held by said frame and rotatably driven about a first fixed longitudinal axis at a first rotational speed, a chassis supported by said shaft for rotation therewith, a circular arc-shaped supporting arm guided by said chassis for rotation about a second axis orthogonal to said longitudinal axis, drive means for rotating said supporting arm about said second axis at a rotational speed less than said first rotational speed, said drive means including a reversably driven worm screw meshing with a toothed sector of said supporting arm, said mandrel being held by said supporting arm, and means for supplying said filament at a coiling plane, said process comprising the steps of:
   positioning one end of said mandrel and said filament in said coiling plane;
   rotating said chassis about said first axis to tension said filament on said one end of said mandrel;
   rotating said chassis about said first axis and rotating said supporting arm in a first direction about said second axis, whereby at least one turn is coiled on said mandrel in a first direction as said mandrel passes through said coiling plane;
   when a second end of said mandrel reaches said coiling plane, the step of reversing said first direction of rotation about said second axis while rotating said chassis about said first axis, whereby at least one turn is coiled on said mandrel in a second direction; and
   repeating said coiling steps until a coiled layer of desired thickness is obtained.

* * * * *